(12) United States Patent
Murata et al.

(10) Patent No.: US 8,835,335 B2
(45) Date of Patent: Sep. 16, 2014

(54) ALKALI-FREE GLASS

(75) Inventors: Takashi Murata, Otsu (JP); Shinkichi Miwa, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/255,343

(22) PCT Filed: Mar. 19, 2010

(86) PCT No.: PCT/JP2010/054790
§ 371 (c)(1),
(2), (4) Date: Sep. 8, 2011

(87) PCT Pub. No.: WO2010/107111
PCT Pub. Date: Sep. 23, 2010

(65) Prior Publication Data
US 2011/0318561 A1    Dec. 29, 2011

(30) Foreign Application Priority Data
Mar. 19, 2009   (JP) ................................ 2009-067142

(51) Int. Cl.
  *C03C 3/091*   (2006.01)
  *C03C 3/093*   (2006.01)

(52) U.S. Cl.
  CPC ................ *C03C 3/091* (2013.01); *C03C 3/093* (2013.01)
  USPC ............................................. 501/66; 501/67

(58) Field of Classification Search
  CPC ................................ C03C 3/091; C03C 3/093
  USPC ..................................................... 501/66, 67
  See application file for complete search history.

(56) References Cited

U.S. PATENT DOCUMENTS

| | | | | |
|---|---|---|---|---|
| 5,811,361 A | * | 9/1998 | Miwa | 501/70 |
| 5,851,939 A | * | 12/1998 | Miwa | 501/70 |
| 6,169,047 B1 | * | 1/2001 | Nishizawa et al. | 501/66 |
| 6,417,124 B1 | | 7/2002 | Peuchert et al. | |
| 6,468,933 B1 | * | 10/2002 | Narita et al. | 501/56 |
| 7,786,035 B2 | * | 8/2010 | Kishimoto et al. | 501/66 |
| 7,960,301 B2 | * | 6/2011 | Niida et al. | 501/66 |
| 8,497,220 B2 | * | 7/2013 | Murata | 501/66 |
| 2005/0026767 A1 | * | 2/2005 | Takase et al. | 501/56 |
| 2005/0209084 A1 | * | 9/2005 | Takaya et al. | 501/11 |
| 2006/0160691 A1 | * | 7/2006 | Kawaguchi et al. | 501/66 |
| 2006/0293162 A1 | * | 12/2006 | Ellison | 501/66 |
| 2007/0213194 A1 | * | 9/2007 | Abensour et al. | 501/66 |
| 2007/0232478 A1 | * | 10/2007 | Fechner et al. | 501/66 |
| 2007/0243992 A1 | | 10/2007 | Fechner et al. | |
| 2008/0194394 A1 | * | 8/2008 | Lecomte | 501/67 |
| 2008/0206494 A1 | * | 8/2008 | Kurachi et al. | 428/1.62 |
| 2009/0129061 A1 | * | 5/2009 | Fechner et al. | 362/97.2 |
| 2009/0226671 A1 | * | 9/2009 | Yanase et al. | 428/156 |
| 2009/0270242 A1 | * | 10/2009 | Yanase et al. | 501/67 |

FOREIGN PATENT DOCUMENTS

| | | |
|---|---|---|
| CN | 1748303 | 3/2006 |
| EP | 1 653 499 | 5/2006 |
| JP | 2003-192377 | 7/2003 |
| JP | 2003-335548 | 11/2003 |
| JP | 2004-189535 | 7/2004 |
| JP | 2005-93422 | 4/2005 |
| JP | 2006-344927 | 12/2006 |
| JP | 2007-161552 | 6/2007 |
| JP | 2007-217192 | 8/2007 |
| JP | 2007-302550 | 11/2007 |
| JP | 2008-266046 | 11/2008 |
| KR | 10-2007-0098661 | 10/2007 |
| WO | 2005/073141 | 8/2005 |
| WO | WO 2007136054 A1 * | 11/2007 |
| WO | WO 2008149888 A1 * | 12/2008 |

OTHER PUBLICATIONS

Derwent Abstract 2004-528948 abstract of JP 2004-189535 A, Jul. 8, 2004.*
Machine Translation of JP 2003-335548 A, Nov. 25, 2003.*
International Preliminary Report on Patentability and Written Opinion of the International Searching Authority issued Oct. 27, 2011 in International (PCT) Application No. PCT/JP2010/054790.
International Search Report issued Apr. 20, 2010 in International (PCT) Application No. PCT/JP2010/054790.
Office Action issued Aug. 20, 2013 in corresponding Chinese Application No. 2013081500884560, with partial translation thereof.
Office Action issued Mar. 14, 2014 in corresponding Chinese Application No. 201080009675.2, with partial English language translation.

* cited by examiner

*Primary Examiner* — Karl Group
*Assistant Examiner* — Elizabeth A Bolden
(74) *Attorney, Agent, or Firm* — Wenderoth, Lind & Ponack, L.L.P.

(57) ABSTRACT

An alkali-free glass of the present invention comprises, as a glass composition expressed in terms of oxides by mass %, 45 to 70% of $SiO_2$, 10 to 30% of $Al_2O_3$, 11 to 20% of $B_2O_3$, less than 0.1% of $As_2O_3$, less than 0.1% of $Sb_2O_3$, and less than 0.1% of an alkali metal oxide, and has a thermal expansion coefficient (30 to 380° C.) of 30 to $35 \times 10^{-7}$/° C.

9 Claims, No Drawings

US 8,835,335 B2

ALKALI-FREE GLASS

TECHNICAL FIELD

The present invention relates to an alkali-free glass, and more specifically, to an alkali-free glass suited to a glass substrate for a flat display such as a liquid crystal display or an OLED display, and suited to a glass substrate for an image sensor such as a chip size package (CSP), a charge coupled device (CCD), or a contact image sensor (CIS).

BACKGROUND ART

In recent years, image sensors such as CSP have been becoming smaller, thinner, and lighter. The sensor part of each of those image sensors was conventionally protected with a resin package. However, in recent years, a mode of protecting the sensor part by bonding a glass substrate on a Si chip is being adopted in order, for example, to make the image sensors much smaller.

In addition, the glass substrate has also been required to be much thinner in order, for example, to make a device smaller, and a glass substrate having a thinner thickness (for example, a glass substrate having a thickness of 0.5 mm or less) is being adopted.

Besides, an alkali-free glass substantially free of an alkali metal oxide is usually used for the glass substrate in order to prevent alkali ions from diffusing in a semiconductor substance formed into a film during a heat treatment process (see Patent Document 1).

CITATION LIST

Prior Art Document

Patent document 1: JP 2006-344927 A

SUMMARY OF INVENTION

Technical Problem

As described above, in the case of applications such as CSP, a glass substrate and a Si chip are bonded directly to each other. However, if the thermal expansion coefficient of an alkali-free glass is inconsistent with that of Si, the difference in thermal expansion coefficient between the both causes the warpage of the glass substrate. In particular, as the thickness of the glass substrate is smaller, the warpage of the glass substrate is more liable to be caused.

In order to solve that problem, the thermal expansion coefficient of the alkali-free glass must be strictly consistent with that of Si. However, the thermal expansion coefficient of Si is as very low as 32 to $34 \times 10^{-7}/°$ C., and when the thermal expansion coefficient of the alkali-free glass is lowered so as to be consistent with that of Si, it becomes difficult to produce a glass substrate with high quality. That is, when the thermal expansion coefficient of the alkali-free glass is lowered, the viscosity of the glass becomes high, leading to a difficulty in enhancing bubble-less quality, and as a result, it becomes difficult to obtain the glass substrate with high quality.

Further, in an image sensor such as CSP, because information for several million pixels is provided in a Si chip of about 2 mm by 2 mm, extremely small defects may cause problems, although such defects are too small to cause problems for pixels of a liquid crystal display, an OLED display, and the like. Besides, the step of bonding an image sensor with a glass substrate is virtually the final step, and hence, when the yield of a device is lowered due to the defects of the glass substrate, productivity of the device remarkably declines.

Further, it is necessary to use a fining agent in order to enhance bubble-less quality of an alkali-free glass, and conventionally used as the fining agent were $As_2O_3$ and $Sb_2O_3$. However, $As_2O_3$ and $Sb_2O_3$ are an environmental load substance, and from the viewpoint of the environment, usage of those substances is preferably as small as possible.

Thus, an alkali-free glass used for that application is required, in particular, (1) to have a thermal expansion coefficient consistent with that of Si, (2) to be excellent in bubble-less quality, and (3) to be free of an environmental load substance (in particular, $As_2O_3$ and $Sb_2O_3$), and in addition to those, is required, for example, (4) to be lightweight, (5) to be capable of being formed into a thin plate at a low cost, (6) to be excellent in surface quality, and (7) to have heat resistance enough for maintaining glass quality when a glass plate and a resin are bonded to each other.

In view of the above-mentioned circumstances, a technical object of the present invention is to provide an alkali-free glass that satisfies various properties required for applications such as CSP, in particular, an alkali-free glass which has a thermal expansion coefficient consistent with that of Si, is excellent in bubble-less quality even when $As_2O_3$ and $Sb_2O_3$ are not used, and is capable of being formed into a thin plate at a low cost.

Solution to Problem

The inventors of the present invention have repeatedly performed various experiments. As a result, the inventors have found that the above-mentioned technical problem can be solved by restricting the range of the glass composition of the alkali-free glass within a predetermined range and restricting glass properties within a predetermined range. Thus, the inventors propose the finding as the present invention. That is, an alkali-free glass of the present invention comprises, as a glass composition expressed in terms of oxides by mass %, 45 to 70% of $SiO_2$, 10 to 30% of $Al_2O_3$, 11 to 20% of $B_2O_3$, less than 0.1% of $As_2O_3$, less than 0.1% of $Sb_2O_3$, and less than 0.1% of an alkali metal oxide, and has a thermal expansion coefficient (30 to 380° C.) of 30 to $35 \times 10^{-7}/°$ C. Here, the "thermal expansion coefficient (30 to 380° C.)" refers to an average value over the temperature range of 30 to 380° C. calculated from the values obtained by measurement with a dilatometer.

The alkali-free glass of the present invention preferably comprises, as a glass composition expressed in terms of oxides by mass %, 50 to 70% of $SiO_2$, 11 to 23% of $Al_2O_3$, 11.5 to 20% of $B_2O_3$, 0 to 8% of MgO, 1 to 10% of CaO, 0 to 2% of SrO, 0 to 2% of BaO, 5 to 12% of MgO+CaO+SrO+BaO, 0.001 to 1% of $SnO_2$, less than 0.05% of $As_2O_3$, less than 0.05% of $Sb_2O_3$, less than 0.1% of F, less than 0.1% of Cl, and less than 0.1% of an alkali metal oxide (total amount of $Li_2O$, $Na_2O$, and $K_2O$), and has a thermal expansion coefficient (30 to 380° C.) of 30 to $35 \times 10^{-7}/°$ C.

The alkali-free glass of the present invention preferably comprises, as a glass composition expressed in terms of oxides by mass %, 50 to 70% of $SiO_2$, 11 to 16% of $Al_2O_3$, 13 to 19% of $B_2O_3$, 0 to 6% of MgO, 1 to 9% of CaO, 0 to 1% of SrO, 0 to 1% of BaO, 7 to 10% of MgO+CaO+SrO+BaO, 0.01 to 0.5% of $SnO_2$, less than 0.05% of $As_2O_3$, less than 0.05% of $Sb_2O_3$, less than 0.1% of F, less than 0.1% of Cl, and less than 0.1% of an alkali metal oxide, and has a thermal expansion coefficient (30 to 380° C.) of 30 to $35 \times 10^{-7}/°$ C.

The alkali-free glass of the present invention is preferably formed by an overflow down-draw method or a slot down-draw method, in particular, an overflow down-draw method. Thereby, the surface quality of the glass can be improved.

The alkali-free glass of the present invention preferably has a plate shape.

The alkali-free glass of the present invention preferably has a plate thickness of 0.6 mm or less.

The alkali-free glass of the present invention is suitable for CSP.

The alkali-free glass of the present invention is also suitable for an OLED display. Because the alkali-free glass of the present invention is excellent in heat resistance, the alkali-free is hard to be caused a thermal contraction during manufacturing process of p-Si TFT or the like, and thus is also suited to this application.

The alkali-free glass of the present invention preferably comprises, as a glass composition expressed in terms of oxides by mass %, 45 to 70% of $SiO_2$, 10 to 30% of $Al_2O_3$, 11 to 20% of $B_2O_3$, 3 to 12% of CaO, less than 0.5% of BaO, less than 0.01% of $As_2O_3$, less than 0.05% of $Sb_2O_3$, less than 0.05% of F, less than 0.05% of Cl, and less than 1% of an alkali metal oxide, and has a thermal expansion coefficient (30 to 380° C.) of 33 to 35×10$^{-7}$/° C., a spectral transmittance at a wavelength of 300 to 800 nm of 85% or more, and an amount of α rays emitted of 5000×10$^{-4}$ C/cm$^2$/h or less. Here, the "spectral transmittance at a wavelength of 300 to 800 nm" refers to a value obtained by measuring an alkali-free glass having a plate thickness in the range of 0.1 to 0.5 mm (preferably plate thickness of 0.5 mm). Meanwhile, the "amount of α rays emitted" can be measured with a gas flow proportional counter measuring apparatus or the like.

DESCRIPTION OF EMBODIMENTS

The following are the reasons why the content of each component in the glass composition of the alkali-free glass of the present invention is limited as mentioned above. It should be noted that the following % representation refers to mass % unless otherwise specified.

The content of $SiO_2$ is 45 to 70%, preferably 50 to 70%, more preferably 55 to 65%, still more preferably 57 to 63%, or most preferably 58 to 62%. If the content of $SiO_2$ is less than 45%, it becomes difficult to produce low-density glass. On the other hand, if the content of $SiO_2$ is more than 75%, the viscosity becomes higher, so that the meltability declines, and in addition to those, defects such as a devitrified crystal (cristobalite) is liable to arise in glass.

The content of $Al_2O_3$ is 10 to 30%. If the content of $Al_2O_3$ is less than 10%, improving the heat resistance becomes difficult, the viscosity becomes higher, and the meltability is likely to decline. Further, $Al_2O_3$ has functions of improving the Young's modulus and enhancing the specific Young's modulus. If the content of $Al_2O_3$ is less than 10%, the Young's modulus is likely to decline. The lower limit range of $Al_2O_3$ is preferably 10% or more, 11% or more, 12% or more, 13% or more, 14% or more, 14.5% or more, 15% or more, or particularly preferably 15.5% or more. On the other hand, if the content of $Al_2O_3$ is more than 30%, the liquidus temperature becomes higher and the denitrification resistance is likely to decline. The upper limit range of $Al_2O_3$ is preferably 23% or less, 20% or less, 19% or less, 18% or less, 17% or less, or particularly preferably 16% or less.

$B_2O_3$ is a component that functions in reducing the viscosity to enhance the meltability. The content of $B_2O_3$ is 11 to 20%. If the content of $B_2O_3$ is less than 11%, its function becomes insufficient, the viscosity becomes higher, the bubble-less quality of glass is likely to decline, and it becomes difficult to produce low-density glass. The lower limit range of $B_2O_3$ is preferably 11% or more, 11.5% or more, 12% or more, 13% or more, 14% or more, 15% or more, or particularly preferably 15.5% or more. On the other hand, if the content of $B_2O_3$ is more than 20%, the heat resistance and the Young's modulus are likely to decline. The upper limit range of $B_2O_3$ is preferably 20% or less, 19% or less, 18% or less, or particularly preferably 17% or less.

In addition to the above-mentioned components, other components may be added up to 25%, or preferably up to 15% in the glass composition of the alkali-free glass of the present invention.

MgO+CaO+SrO+BaO are components that lower the liquidus temperature, and prevent a crystal contaminant from being liable to arise in glass, and are components that enhance the meltability and formability. The content of MgO+CaO+SrO+BaO is preferably 5 to 12%, 7 to 10%, 7.5 to 9.5%, or particularly preferably 8 to 9%. If the content of MgO+CaO+SrO+BaO is too small, MgO+CaO+SrO+BaO cannot fully exert their functions as a melting accelerate component, and as a result, the meltability declines and the thermal expansion coefficient becomes too low, resulting in difficulty in causing the thermal expansion coefficient of the alkali-free glass to be consistent with that of Si. On the other hand, if the content of MgO+CaO+SrO+BaO is too large, the density increases, resulting in difficulty in producing a lightweight glass, and the specific Young's modulus declines and the thermal expansion coefficient becomes too high.

MgO is a component that lowers the viscosity and enhances the meltability without lowering the strain point, and is a component, among alkaline-earth metal oxides, that has an effect of reducing the density to the lowest level. The content of MgO is preferably 0 to 8%, 0 to 6%, 0 to 2%, 0 to 1%, 0 to 0.5%, or particularly preferably 0 to 0.1%. However, if the content of MgO is too large, the liquidus temperature rises and the denitrification resistance is likely to decline. It should be noted that if the value of the mass ratio MgO/$B_2O_3$ becomes 0.6 or more, the phase separation is likely to result. Thus, the value of the mass ratio MgO/$B_2O_3$ is preferably 0.5 or less, 0.3 or less, 0.1 or less, less than 0.08, or particularly preferably less than 0.05.

CaO is a component that lowers the viscosity and remarkably enhances the meltability without lowering the strain point, and is a component that has an effect of highly suppressing the devitrification of glass in the glass composition system of the present invention. If the content of CaO is relatively increased in the content of alkaline-earth metal oxides, it becomes easy to reduce the density of glass. The lower limit range of CaO is preferably 1% or more, 2% or more, 3% or more, 5% or more, or particularly preferably 7% or more. On the other hand, if the content of CaO is more than 10%, the thermal expansion coefficient and the density become too high and the component balance in the glass composition becomes impaired, and as a result, the devitrification resistance is likely to decline. The upper limit range of CaO is preferably 10% or less, 9.5% or less, or particularly preferably 9% or less.

SrO is a component that lowers the viscosity and enhances the meltability without lowering the strain point. If the content of SrO is too large, the density and the thermal expansion coefficient is likely to increase. Further, if the content of SrO is larger, the contents of CaO and MgO become smaller relatively in order to make the thermal expansion coefficient of glass consistent with that of Si, and as a result, the devitrification resistance declines and the viscosity is likely to increase. The content of SrO is preferably 0 to 2%, 0 to 1.5%, 0 to 1%, 0 to 0.5%, or particularly preferably 0 to 0.1%.

BaO is a component that lowers the viscosity and enhances the meltability without lowering the strain point. If the content of BaO is too large, the density and the thermal expansion coefficient are likely to increase. Further, if the content of BaO is larger, the contents of CaO and MgO become smaller relatively in order to make the thermal expansion coefficient of glass consistent with that of Si, and as a result, the denitrification resistance declines and the viscosity is likely to increase. The content of BaO is preferably 0 to 2%, 0 to 1.5%, 0 to 1%, 0 to 0.5%, 0 to less than 0.5%, or particularly preferably 0 to less than 0.1%.

$SnO_2$ is a component that has a good fining function in a high temperature range, and is a component that lowers the viscosity. The content of $SnO_2$ is preferably 0 to 1%, 0.001 to 1%, 0.01 to 0.6%, 0.01 to 0.5%, or particularly preferably 0.05 to 0.3%. If the content of $SnO_2$ is more than 1%, a devitrified crystal of $SnO_2$ is likely to precipitate in glass. It should be noted that if the content of $SnO_2$ is less than 0.001%, it becomes difficult for the glass to receive the benefit of the above-mentioned effects.

ZnO is a component that enhances the meltability. However, if ZnO is contained in the glass composition in a large amount, glass is likely to denitrify, the strain point declines, and the density is likely to increase. Thus, the content of ZnO is preferably 0 to 5%, 0 to 3%, 0 to 0.5%, or particularly preferably 0 to 0.3%. It is ideal and desired that glass be substantially free of ZnO. Here, the "substantially free of ZnO" refers to the case where the content of ZnO in the glass composition is 0.1% or less.

$ZrO_2$ is a component that increases the Young's modulus. The content of $ZrO_2$ is preferably 0 to 5%, 0 to 3%, 0 to 0.5%, or particularly preferably 0.01 to 0.2%. If the content of $ZrO_2$ is more than 5%, the liquidus temperature rises and a devitrified crystal of zircon is likely to precipitate. Further, if the content of $ZrO_2$ is too large, the count value of α rays is likely to rise, and as a result, it becomes difficult to apply the resultant glass to a device such as CSP. Thus, if desired characteristics can be obtained by using other components, it is ideal and desired that glass be substantially free of $ZrO_2$. Here, "substantially free of $ZrO_2$" refers to the case where the content of $ZrO_2$ in the glass composition is 0.01% or less.

$TiO_2$ is a component that lowers the viscosity, enhances the meltability, and suppresses the solarization. However, if $TiO_2$ is contained in a large amount in the glass composition, glass is colored and the transmittance is likely to decline. Thus, the content of $TiO_2$ is preferably 0 to 5%, 0 to 3%, 0 to 1%, or particularly preferably 0 to 0.02%.

$P_2O_5$ is a component that enhances the denitrification resistance. However, if $P_2O_5$ is contained in a large amount in the glass composition, phase separation and opaline are generated in glass, and the water resistance remarkably declines. Thus, the content of $P_2O_5$ is preferably 0 to 5%, 0 to 1%, or particularly preferably 0 to 0.5%.

$Y_2O_3$ has functions of raising the strain point, the Young's modulus, and the like. However, if the content of $Y_2O_3$ is more than 5%, the density is likely to increase. $Nb_2O_5$ has functions of raising the strain point, the Young's modulus, and the like. However, if the content of $Nb_2O_5$ is more than 5%, the density is likely to increase. $La_2O_3$ has functions of raising the strain point, the Young's modulus, and the like. However, if the content of $La_2O_3$ is more than 5%, the density is likely to increase.

As described above, the alkali-free glass of the present invention is, in principle, substantially free of an alkali metal oxide, the content of which is less than 0.1%. Note that, in the case where an alkali metal oxide may be contained to some extent, the alkali metal oxide may be added in the range of 0.01 to less than 1%.

As described above, $SnO_2$ is suitably added as a fining agent to the alkali-free glass of the present invention. However, as long as the characteristics of glass are not impaired, $CeO_2$, $SO_3$, C, or powdered metals (for example, Al and Si) may be added up to 5% as a fining agent in place of $SnO_2$ or in combination with $SnO_2$.

$As_2O_3$ and $Sb_2O_3$ also effectively act as fining agents. It is not necessary that these components be completely excluded in the alkali-free glass of the present invention. However, as described above, from the viewpoint of the environment, the content of each of these components should be restricted to less than 0.1%, or preferably less than 0.05%. Meanwhile, halogens such as F and Cl have the effects of lowering the melting temperature and of promoting the function of a fining agent, and as a result, it is possible to lengthen the life of a glass manufacturing furnace while the melting cost of glass is lowered. However, if the contents of F and Cl are too large, in applications such as CSP, a metal wire pattern formed on a glass substrate may corrode. Thus, each of the contents of F and Cl is preferably 1% or less, 0.5% or less, less than 0.1%, 0.05% or less, less than 0.05%, or particularly preferably 0.01% or less.

When each of the components in the alkali-free glass of the present invention is defined as follows, the thermal expansion coefficient of the alkali-free glass is easily consistent with that of Si, the viscosity declines, and the liquidus viscosity is likely to increase. (1) The alkali-free glass comprises, as a glass composition expressed in terms of oxides by mass %, 50 to 70% of $SiO_2$, 11 to 16% of $Al_2O_3$, 13 to 19% of $B_2O_3$, 7 to 10% of MgO+CaO+SrO+BaO, 0 to 6% of MgO, 3 to 9% of CaO, 0 to 1% of SrO, 0 to 1% of BaO, less than 0.05% of $As_2O_3$, less than 0.05% of $Sb_2O_3$, less than 0.1% of F, less than 0.1% of Cl, and less than 0.1% of an alkali metal oxide. (2) The alkali-free glass comprises, as a glass composition expressed in terms of oxides by mass %, 50 to 70% of $SiO_2$, 13 to 16% of $Al_2O_3$, 13 to 18% of $B_2O_3$, 7 to 9% of MgO+CaO+SrO+BaO, 0 to 2% of MgO, 5 to 9% of CaO, 0 to 0.5% of SrO, 0 to 0.5% of BaO, 0.01 to 0.6% of $SnO_2$, less than 0.05% of $As_2O_3$, less than 0.05% of $Sb_2O_3$, less than 0.1% of F, less than 0.1% of Cl, and less than 0.1% of an alkali metal oxide. (3) The alkali-free glass comprises, as a glass composition expressed in terms of oxides by mass %, 50 to 70% of $SiO_2$, 13 to 16% of $Al_2O_3$, 14 to 18% of $B_2O_3$, 7 to 9% of MgO+CaO+SrO+BaO, 0 to 1% of MgO, 7 to 9% of CaO, 0 to 0.1% of SrO, 0 to 0.1% of BaO, 0.01 to 0.6% of $SnO_2$, less than 0.01% of $As_2O_3$, less than 0.01% of $Sb_2O_3$, less than 0.05% of F, less than 0.05% of Cl, and less than 0.1% of an alkali metal oxide.

In the alkali-free glass of the present invention, the lower limit range of the thermal expansion coefficient (30 to 380° C.) is preferably $30 \times 10^{-7}$/° C. or more, or particularly preferably $31 \times 10^{-7}$/° C. or more, and the upper limit range of the thermal expansion coefficient is preferably $35 \times 10^{-7}$/° C. or less, or particularly preferably $34 \times 10^{-7}$/° C. or less. The most preferred thermal expansion coefficient (30 to 380° C.) is $33 \times 10^{-7}$/° C. If the thermal expansion coefficient is outside the above-mentioned range, when the alkali-free glass is bonded with a Si chip, the degree of the warpage of a glass substrate tends to become large. Further, as the thickness of a glass substrate is smaller, the degree of the warpage of the glass substrate attributed to the difference in thermal expansion coefficient becomes larger. Thus, when the thickness of a glass substrate is small (for example, the thickness of a glass substrate is 0.6 mm or less), the significance of restricting the thermal expansion coefficient in the above-mentioned range is great.

The alkali-free glass of the present invention has a density of preferably less than 2.45 g/cm³, less than 2.42 g/cm³, less than 2.40 g/cm³, less than 2.38 g/cm³, less than 2.35 g/cm³, or particularly preferably less than 2.34 g/cm³. If the density is 2.45 g/cm³ or more, it becomes difficult to produce a lightweight glass, and in the case of a plate-shaped glass, the glass is liable to deflect due to its own weight. Here, the "density" refers to a value obtained by measurement by the known Archimedes' method.

The alkali-free glass of the present invention has a strain point of preferably 600° C. or more, 620° C. or more, 630° C. or more, 640° C. or more, 650° C. or more, or particularly preferably 660° C. or more. As described previously, if the strain point is lower, when the alkali-free glass is bonded with a resin, the glass quality may be impaired. In addition, if the strain point is lower, when the alkali-free glass is used as a glass substrate for OLED, the glass is likely to be caused a thermal contraction during the manufacturing process of p-Si TFT.

High-temperature melting increases the load of a glass melting furnace. For example, as a refractory such as alumina or zirconia used in a glass melting furnace is exposed to a higher temperature, the refractory is eroded more vigorously by a molten glass. When the extent of the erosion of the refractory becomes large, the life cycle of the glass melting furnace becomes short, and as a result, the production cost of glass significantly increases. Further, when high-temperature melting is performed, it is necessary to use constituent members with high heat resistance for a glass melting furnace, leading to rise in the price of the constituent members of the glass melting furnace, and as a result, the melting cost of glass significantly increases. Further, high-temperature melting requires to keep the inside of a glass melting furnace at high temperatures, and hence the running cost of the high-temperature melting significantly increases compared with that of low-temperature melting. The alkali-free glass of the present invention has a temperature at $10^{2.5}$ dPa·s of preferably 1590° C. or less, 1580° C. or less, 1570° C. or less, 1560° C. or less, or particularly preferably 1550° C. or less. If the temperature at $10^{2.5}$ dPa·s is more than 1590° C., low-temperature melting is difficult to perform, and the bubble-like quality of glass is likely to decline, and as a result, the production cost of the glass tends to significantly increase. Here, the "temperature at $10^{2.5}$ dPa·s" refers to a value obtained by measurement by a platinum sphere pull up method.

The alkali-free glass of the present invention has a liquidus temperature of preferably 1180° C. or less, 1100° C. or less, 1070° C. or less, or particularly preferably 1060° C. or less. Thereby, the glass is hard to be generated a devitrified crystal, and hence, the glass can be easily formed by an overflow down-draw method or the like, with the result that the surface quality of the glass can be improved, and the production cost of the glass can be lowered. It should be noted that liquidus temperature is an index of the denitrification resistance of glass, and as the liquidus temperature of glass is lower, the glass is more prominent in its denitrification resistance. Here, the "liquidus temperature" refers to a value obtained by measuring a temperature at which crystals of glass are deposited after glass powders that passed through a standard 30-mesh sieve (500 μm) and remained on a 50-mesh sieve (300 μm) are placed in a platinum boat and kept for 24 hours in a gradient heating furnace.

The alkali-free glass of the present invention has a liquidus viscosity of preferably $10^{4.5}$ dPa·s or more, $10^{5.0}$ dPa·s or more, $10^{5.5}$ dPa·s or more, $10^{5.7}$ dPa·s or more, or particularly preferably $10^{6.0}$ dPa·s or more. Thereby, the glass is hard to be generated a devitrified crystal during forming, and hence, the glass can be easily formed by an overflow down-draw method or the like, with the result that the surface quality of the glass can be enhanced, and the production cost of the glass can be lowered. It should be noted that liquidus viscosity is an index for formability, and as the liquidus viscosity is higher, the formability is more prominent. Here the "liquidus viscosity" refers to a value obtained by measuring the viscosity of glass at a liquidus temperature using a platinum sphere pull up method.

The alkali-free glass of the present invention has a spectral transmittance at a wavelength of 300 to 800 nm of preferably 85% or more, 86% or more, 87% or more, or particularly preferably 88% or more. The alkali-free glass of the present invention can be used for a substrate or cover glass for a silicon quantum dot solar cell and a thin-film silicon solar cell. These applications require that glass have a high spectral transmittance in the wavelength region including the UV region. Thus, when the spectral transmittance of glass at a wavelength of 300 to 800 nm is restricted within the above-mentioned range, the glass can be suitably used for those applications. It should be noted that if a particular material is used as a raw glass material or a particular glass manufacturing facility is used (for example, a material containing Fe in a small amount, or a glass manufacturing facility in which contamination of Fe does not easily occur), the spectral transmittance of the glass at a wavelength of 300 to 800 nm can be increased.

The alkali-free glass of the present invention has an amount of α rays emitted of preferably $5000 \times 10^{-4}$ C/cm²/h or less, $3000 \times 10^{-4}$ C/cm²/h or less, $1000 \times 10^{-4}$ C/cm²/h or less, or particularly preferably $500 \times 10^{-4}$ C/cm²/h or less. When the α ray generated from a glass substrate or the like enters a device, the energy of the α ray induces a hole and an electron pair, which may cause a so-called soft error which is a phenomenon that a luminescent spot or a white spot appears in an image instantaneously. Thus, when the amount of α rays emitted is reduced, the above-mentioned deficiency is likely to be prevented. It should be noted that if a high-purity material containing radioisotopes in small amounts and emitting α rays in small amounts is used as a raw glass material, the amount of α rays emitted can be reduced. Alternatively, during the steps of melting and fining glass, if a molten glass is prevented from being contaminated with a radioisotope derived from a glass manufacturing facility, the amount of α rays emitted can be reduced effectively.

The alkali-free glass of the present invention can be produced by feeding a raw glass material blended so as to have a predetermined glass composition into a continuous glass melting furnace, melting the raw glass material under heating, subjecting the resultant molten glass to a fining treatment, and then supplying the resultant glass to a forming apparatus to form into a plate-shaped glass or the like.

The alkali-free glass of the present invention is preferably formed by an overflow down-draw method. Thereby, it is possible to obtain a plate-shaped glass having good surface quality even without being subjected to polishing. Here, the overflow down-draw method refers to a method in which a molten glass is caused to overflow from both sides of a heat-resistant trough-shaped structure, and the overflowing molten glasses are subjected to down-draw downward while being joined at the lower end of the trough-shaped structure, to thereby produce a plate-shaped glass. When the glass plate is formed by the overflow down-draw method, the surface that should serve as the surface of the glass plate is formed in the state of a free surface without contacting a trough-shaped structure, and hence it is possible to increase the surface quality of the glass. The structure and material of the trough-shaped structure are not particularly limited as long as the size and surface quality of the glass can be made in desired state and thereby desired quality can be realized. In addition, the overflow down-draw method may include any way of applying force to the glass in order to down-draw the glass downward. For instance, it may be possible to employ a method in which the glass is drawn while a heat-resistant roll having a sufficiently large width is rotated in contact with the glass. Alternatively, for instance, it may be possible to employ a method in which the glass is drawn while multiple pairs of heat-resistant rolls are caused to have contact with only the vicinity of the edge surfaces of the glass. The alkali-free glass of the present invention is excellent in denitrification resistance and has viscosity properties suited to forming, and hence can contribute to forming a plate-shaped glass efficiently by the overflow down-draw method.

In addition to the overflow down-draw method, any of other various forming methods can be employed for the alkali-free glass of the present invention. For instance, it is possible to employ a forming method such as a slot down-draw method, a float method, or a rollout method. It should be noted that employing the slot down-draw method leads to efficient formation of a plate-shaped glass having a small thickness.

The alkali-free glass of the present invention preferably has a plate shape. Thereby, the glass can be applied to a glass substrate for a flat display such as a liquid crystal display and an OLED display and to a glass substrate for an image sensor such as CSP, CCD, and CIS. Further, when the alkali-free glass of the present invention has a plate shape, the alkali-free glass has a thickness of preferably 0.6 mm or less, 0.5 mm or less, 0.3 mm or less, 0.2 mm or less, or particularly preferably 0.1 mm or less. As the plate thickness of a glass is smaller, the glass can be made more lightweight, and as a result, a device can also be made lightweight. It should be noted that the alkali-free glass of the present invention has a high liquidus viscosity, and hence has advantages that the alkali-free glass is easily formed into a glass by an overflow down-draw method, and a thin glass plate having good surface quality is easily produced at a low cost.

Example 1

Hereinafter, the present invention is described in detail based on examples.

Table 1 shows the examples of the present invention (Sample Nos. 1 to 11).

TABLE 1

| | | Example | | | | | | | | | | |
|---|---|---|---|---|---|---|---|---|---|---|---|---|
| | | No. 1 | No. 2 | No. 3 | No. 4 | No. 5 | No. 6 | No. 7 | No. 8 | No9 | No. 10 | No. 11 |
| Glass composition (mass %) | $SiO_2$ | 59.6 | 58.2 | 61.7 | 62.4 | 62.9 | 62.4 | 59.0 | 60.7 | 60.7 | 59.3 | 60.25 |
| | $Al_2O_3$ | 15.5 | 15.5 | 15.5 | 14.5 | 14.5 | 14.5 | 16.5 | 18.0 | 13.0 | 15.5 | 15.5 |
| | $B_2O_3$ | 16.5 | 16.5 | 12.0 | 15.0 | 14.0 | 15.0 | 16.0 | 13.0 | 18.0 | 16.5 | 15.5 |
| | MgO | — | 5.5 | 6.5 | — | — | 1.0 | — | — | — | — | 0.5 |
| | CaO | 8.0 | 4.0 | 4.0 | 8.0 | 8.5 | 7.0 | 7.0 | 8.0 | 8.3 | 8.5 | 8.0 |
| | SrO | — | — | — | — | — | — | 1.0 | — | — | — | — |
| | $SnO_2$ | 0.3 | 0.3 | 0.3 | 0.1 | 0.1 | 0.1 | 0.5 | 0.3 | — | 0.2 | 0.2 |
| | $ZrO_2$ | 0.1 | — | — | — | — | — | — | — | — | — | 0.05 |
| Density (g/cm³) | | 2.33 | 2.36 | 2.39 | 2.33 | 2.34 | 2.33 | 2.35 | 2.36 | 2.31 | 2.33 | 2.33 |
| α (×10⁻⁷/° C.) | | 32.5 | 32.3 | 32.1 | 31.9 | 32.5 | 31.4 | 31.8 | 31.4 | 33.4 | 33.0 | 32.5 |
| Ps (° C.) | | 641 | 653 | 672 | 652 | 659 | 654 | 645 | 673 | 624 | 630 | 640 |
| Ta (° C.) | | 696 | 699 | 718 | 708 | 715 | 709 | 700 | 730 | 679 | 685 | 695 |
| Ts (° C.) | | 944 | — | — | 958 | 962 | 942 | 951 | 977 | 928 | 930 | 945 |
| $10^{4.0}$ dPa·s (° C.) | | 1280 | 1229 | 1253 | 1316 | 1321 | 1310 | 1283 | 1305 | 1283 | 1260 | 1285 |
| $10^{3.0}$ dPa·s (° C.) | | 1446 | 1378 | 1407 | 1488 | 1493 | 1481 | 1446 | 1466 | 1457 | 1430 | 1445 |
| $10^{2.5}$ dPa·s (° C.) | | 1550 | 1475 | 1504 | 1593 | 1599 | 1585 | 1546 | 1566 | 1564 | 1530 | 1540 |
| Young's modulus (GPa) | | 67 | — | — | 67 | 69 | 68 | 67 | 71 | 64 | 65 | 66 |
| TL (° C.) | | 1065 | 1050 | 1170 | — | — | — | — | — | — | 1060 | 1070 |
| $\log_{10}\eta TL$ | | 6.0 | 5.8 | 4.7 | — | — | — | — | — | — | 6.0 | 6.0 |
| T (%) | | — | — | — | — | — | — | — | — | — | 89 | 88 |
| Amount of α rays emitted (×10⁻⁴ C/cm²/h) | | — | — | — | — | — | — | — | — | — | 50 | 500 |

Sample Nos. 1 to 11 were prepared in the following manner. Raw glass materials which were blended so as to attain the glass compositions in the table were loaded into a platinum crucible to melt at 1600° C. for 24 hours, and then the resultant molten glass was poured on a carbon plate to form into a plate shape. It should be noted that taking the spectral transmittance T and the amount of α rays emitted into consideration, raw glass materials containing impurities in small amounts were used. Next, each of the resultant samples was evaluated for its density, thermal expansion coefficient α, strain point Ps, annealing point Ta, softening point Ts, temperature at $10^4$ dPa·s, temperature at $10^3$ dPa·s, temperature at $10^{2.5}$ dPa·s, Young's modulus, liquidus temperature TL, liquidus viscosity log η TL, spectral transmittance T, and amount of α rays emitted.

The density refers to a value obtained by measurement by the known Archimedes' method.

The thermal expansion coefficient α refers to an average value over the temperature range of 30 to 380° C. calculated from the values obtained by measurement with a dilatometer.

The strain point Ps, the annealing point Ta, and the softening point Ts are values obtained by measurement based on the method of ASTM C336.

The temperature at $10^{4.0}$ dPa·s, the temperature at $10^{3.0}$ dPa·s, and the temperature at $10^{2.5}$ dPa·s are values obtained by measurement by a platinum sphere pull up method.

The Young's modulus refers to a value obtained by measurement by a resonance method. As the Young's modulus is larger, the specific Young's modulus (Young's modulus/density) tends to be larger, and in the case of a plate-shaped glass, the glass becomes hard to deflect due to its own weight. It should be noted that the alkali-free glass of the present invention preferably has a Young's modulus of 64 GPa or more.

The liquidus temperature TL refers to a value obtained by measuring a temperature at which crystals of glass are deposited after glass powders that passed through a standard 30-mesh sieve (500 μm) and remained on a 50-mesh sieve (300 μm) are placed in a platinum boat and kept for 24 hours in a gradient heating furnace.

The liquidus viscosity log ηTL refers to a value obtained by measuring the viscosity of glass at a liquidus temperature TL using a platinum sphere pull up method.

The spectral transmittance T is a value obtained by measurement at a wavelength of 300 to 800 nm using a spectrophotometer. It should be noted that a plate-shaped glass prepared by the method of "Example 2" was used as a measurement sample, and the value of the spectral transmittance at 300 nm was shown as a representative value.

The amount of α rays emitted refers to a value obtained by measurement with a gas flow proportional counter measuring apparatus.

As evident from Table 1, because each of the glass compositions of Sample Nos. 1 to 11 was restricted within a predetermined range, Sample Nos. 1 to 11 each had a density of 2.40 g/cm$^3$ or less, a strain point of 620° C. or more, a temperature at 10$^{2.5}$ dPa·s of 1600° C. or less, and a thermal expansion coefficient of 31.4 to 33.4×10$^{-7}$/° C., and was good in bubble-less quality even though $As_2O_3$ and $Sb_2O_3$ were not included in their glass compositions. Of those samples, Sample Nos. 1 to 3, 10, and 11 each had a liquidus temperature of 1170° C. or less and a liquidus viscosity of 10$^{4.7}$ dPa·s or more, and hence was prominent in denitrification resistance and formability.

Example 2

Each of Sample Nos. 1, 2, 10, and 11 listed in Table 1 was melted in a test melting furnace and was formed into a plate-shaped glass having a thickness of 0.5 mm by an overflow down-draw method. As a result, the glass had a warpage of 0.075% or less, a waviness (WCA) of 0.15 μm or less (cutoff fh: 0.8 mm, fl: 8 mm), and a surface roughness (Ry) of 20 Å or less (cutoff λc: 9 μm). When the forming of the glass was performed, appropriately adjusted were the rate of a drawing roller, the rate of a cooling roller, the temperature distribution of a heating apparatus, the temperature of a molten glass, the flow rate of glass, the rate of drawing, the rotation number of a stirrer, and the like, to thereby control the surface quality of the glass. It should be noted that the "warpage" refers to a value obtained by measurement of the glass placed on an optical tabletop by using a feeler gauge described in JIS B-7524. The "waviness" refers to a value obtained by measuring filtered centerline waviness (WCA) described in JIS B-0610 by using a stylus profilometer. The measurement is performed according to the SEMI STD D15-1296 "FPD glass substrate surface waviness measurement method". The "average surface roughness (Ry)" refers to a value obtained by measurement by a method according to the SEMI D7-94 "FPD glass substrate surface roughness measurement method".

INDUSTRIAL APPLICABILITY

The alkali-free glass of the present invention is suitably applicable to a glass substrate for a flat display such as a liquid crystal display and an OLED display, and to a glass substrate for an image sensor such as a chip size package (CSP), a charge coupled device (CCD), and a contact image sensor (CIS).

In addition, the alkali-free glass of the present invention is suitably applicable to a cover glass or spacer for a display device for projection use, such as a digital micromirror device (DMD) or a liquid crystal on silicon (LCOS). In these devices, an electronic circuit that drives a display or the like is formed on an Si wafer, and a cover glass, a spacer, and the like are bonded to the Si wafer with an ultraviolet curable resin, a thermoset resin, a glass frit, or the like. When the alkali-free glass of the present invention is applied to these uses, it is desirable that the thermal expansion coefficient of the cover glass or the like be strictly matched to that of the Si wafer in order to reduce the degrees of the warpage and strain of the devices. The alkali-free glass of the present invention is suited to these uses, because its thermal expansion coefficient is strictly restricted.

In addition, the alkali-free glass of the present invention can be suitably used for a substrate or cover glass for a silicon quantum dot solar cell and thin-film silicon solar cell. In these devices, a Si film layer is formed on a substrate. When the alkali-free glass of the present invention is applied to these uses, it is desirable that the thermal expansion coefficient of the glass substrate or the like be strictly matched to that of the Si film layer in order to reduce the degrees of the warpage and strain of the devices. The alkali-free glass of the present invention is suited to these uses, because its thermal expansion coefficient is strictly restricted. It should be noted that when the alkali-free glass of the present invention is applied to these uses, the spectral transmittance of the glass substrate or the like is, as described above, also required to be very high in the wavelength region including the UV region.

The invention claimed is:

1. A glass, comprising, as a glass composition expressed in terms of oxides by mass %, 45 to 70% of $SiO_2$, 10 to 30% of $Al_2O_3$, 13 to 20% of $B_2O_3$, 0 to 1% of MgO, 0 to 0.02% of $TiO_2$, less than 0.1% of $As_2O_3$, less than 0.1% of $Sb_2O_3$, less than 0.01% of Cl, and 0.01 to less than 1% of alkali metal oxide, wherein a mass ratio of $MgO/B_2O_3$ is less than 0.05, and wherein the glass has a thermal expansion coefficient (30 to 380° C.) of 30 to 35×10$^{-7}$/° C.

2. The glass according to claim 1, comprising, as a glass composition expressed in terms of oxides by mass %, 50 to 70% of $SiO_2$, 11 to 23% of $Al_2O_3$, 13 to 20% of $B_2O_3$, 0 to 1% of MgO, 1 to 10% of CaO, 0 to 2% of SrO, 0 to 2% of BaO, 5 to 12% of MgO+CaO+SrO+BaO, 0 to 0.02% of $TiO_2$, 0.001 to 1% of $SnO_2$, less than 0.05% of $As_2O_3$, less than 0.05% of $Sb_2O_3$, less than 0.1% of F, less than 0.01% of Cl, and 0.01 to less than 1% of alkali metal oxide, wherein the glass has a thermal expansion coefficient (30 to 380° C.) of 30 to 35×10$^{-7}$/° C.

3. The glass according to claim 1, comprising, as a glass composition expressed in terms of oxides by mass %, 50 to 70% of $SiO_2$, 11 to 16% of $Al_2O_3$, 13 to 19% of $B_2O_3$, 0 to less than 0.95% of MgO, 4 to 9% of CaO, 0 to 1% of SrO, 0 to 1% of BaO, 7 to 10% of MgO+CaO+SrO+BaO, 0 to 0.02% of $TiO_2$, 0.01 to 0.5% of $SnO_2$, less than 0.05% of $As_2O_3$, less than 0.05% of $Sb_2O_3$, less than 0.1% of F, less than 0.01% of Cl, and 0.01 to less than 1% of alkali metal oxide, wherein the glass has a thermal expansion coefficient (30 to 380° C.) of 30 to 35×10$^{-7}$/° C.

4. The glass according to claim 1, wherein the glass is formed by an overflow down-draw method or a slot down-draw method.

5. The glass according to claim 1, wherein the glass has a plate shape.

6. The glass according to claim 5, wherein the glass has a thickness of 0.6 mm or less.

7. The glass according to claim 1, wherein the glass is used for a chip size package.

8. The glass according to claim 1, wherein the glass is used for an OLED display.

9. A glass, comprising, as a glass composition expressed in terms of oxides by mass %, 45 to 70% of $SiO_2$, 10 to 30% of $Al_2O_3$, 13 to 20% of $B_2O_3$, 0 to 1% of MgO, 3 to 12% of CaO, less than 0.5% of BaO, 0 to 0.02% of $TiO_2$, less than 0.01% of $As_2O_3$, less than 0.05% of $Sb_2O_3$, less than 0.05% of F, less than 0.01% of Cl, and 0.01 to less than 1% of alkali metal oxide, wherein a mass ratio of $MgO/B_2O_1$ is less than 0.05, and wherein the glass has a thermal expansion coefficient (30 to 380° C.) of 33 to $35 \times 10^{-7}$/° C., a spectral transmittance at a wavelength of 300 to 800 nm of 85% or more, and an amount of αrays emitted of $5000 \times 10^{-4}$ $C/cm^2/h$ or less.

\* \* \* \* \*